(12) United States Patent
Aleksadrov et al.

(10) Patent No.: US 12,328,840 B2
(45) Date of Patent: Jun. 10, 2025

(54) HEATER DEVICE FOR MINING CRYPTOCURRENCY

(71) Applicant: Heatbit inc., Dover, DE (US)

(72) Inventors: Igor Aleksadrov, Krasnodar (RU);
Dmitriy Aleksandrov, Krasnodar (RU);
Anton Khromov, Moscow (RU);
Vasily Kostromin, Moscow (RU);
Vadim Rustamov, Moscow (RU);
Alexander Busarov, Shanghai (CN)

(73) Assignee: HEATBIT INC., Dover, DE (US)

( * ) Notice: Subject to any disclaimer, the term of this patent is extended or adjusted under 35 U.S.C. 154(b) by 0 days.

(21) Appl. No.: 17/858,836

(22) Filed: Jul. 6, 2022

(65) Prior Publication Data
US 2025/0133687 A1     Apr. 24, 2025

(51) Int. Cl.
*H05K 7/20*     (2006.01)
*H05K 5/00*     (2006.01)
*H05K 7/14*     (2006.01)

(52) U.S. Cl.
CPC ....... *H05K 7/20136* (2013.01); *H05K 5/0056* (2013.01); *H05K 5/0078* (2013.01); *H05K 7/14322* (2022.08)

(58) Field of Classification Search
CPC ........... H05K 7/20136; H05K 7/14322; H05K 5/0056; H05K 5/0078
USPC ........................................................ 361/695
See application file for complete search history.

(56) References Cited

U.S. PATENT DOCUMENTS

| | | | |
|---|---|---|---|
| 10,609,839 B1* | 3/2020 | Archer | H05K 7/20772 |
| 11,270,298 B2* | 3/2022 | Pauker | G06Q 20/3678 |
| 11,489,736 B2* | 11/2022 | Balakrishnan | G06F 1/3206 |
| 11,907,029 B2* | 2/2024 | Barbour | G06F 1/20 |
| 12,086,879 B2* | 9/2024 | Wu | H05K 7/207 |
| 2020/0403984 A1* | 12/2020 | Minehan | H04L 9/3247 |
| 2023/0037377 A1* | 2/2023 | Fresa | G06F 1/206 |
| 2023/0095559 A1* | 3/2023 | Smeloy | H04L 9/0643 709/201 |

* cited by examiner

*Primary Examiner* — Zhengfu J Feng
(74) *Attorney, Agent, or Firm* — INVENTA CAPITAL GROUP PLC

(57) ABSTRACT

A heater device connectable to a network and adapted to mine cryptocurrency includes a housing having at least one sidewall, a top cover, and a bottom cover, the at least one sidewall including a sound insulation layer connectable thereto. A mining assembly is configured to mine cryptocurrency. The mining assembly includes a shroud that includes a mining motherboard, a power supply unit, and a control board and a fan assembly connectable to the mining assembly. The fan assembly is configured to transfer heat when generated by the mining assembly. The sound insulation layer surrounds both the mining and fan assemblies to provide noise absorption of the mining assembly or fan assembly when the heater device is activated.

20 Claims, 6 Drawing Sheets

HEATER DEVICE FOR MINING CRYPTOCURRENCY

FIELD OF THE INVENTION

The present invention relates generally to the recuperation of heat and, more particularly, to heat recovery for use in heating of closed environments.

BACKGROUND OF PRIOR ART

A heat recuperating system adapted for recuperating heat generated by mining devices, such as cryptocurrency miners, and for using the recuperating heat in agri-food industry applications are known in the art. One of such systems is disclosed in US Patent Publication No. 20210141429 to Larocque (the "Larocque reference"). As stated in the background of the Larocque reference, in certain conditions, such as in cold climate lands, significant heating is required to operate greenhouses. There are various heating systems and heating sources known in the art, but the high cost of the heating sources is a deterrent to efficiently and profitability and thus commercially using these greenhouses.

The Larocque reference is focused on an apparatus and/or a method for greenhouses to be affordably heated and also to take advantages of drawbacks of other technologies, i.e. the Blockchain technology. As disclosed in this prior art reference, a heat recuperating system presents a technical room with an air supply area, an exhausted air area and a computation area dividing the air supply area from the exhausted air area, wherein the computation area houses the mining devices. The heat recuperating system also disclosed a heat exchanger system recuperating heat from the exhausted air area of the technical room and transmitting the recuperated heat to the agri-food industry applications.

There is always a need for a novel system and method adaptable to improve and eliminate drawbacks of other technologies, i.e. the Blockchain and mining technologies.

It would thus be desirable to provide a novel apparatus and/or method for heating closed environments such as apartments, offices, houses, and other closed environments, wherein the novel apparatus will be compact, flexible to heat small closed environments such as, for example, small offices, apartments, houses, and reducing both vibration and noise.

SUMMARY OF THE INVENTION

The present invention provides an apparatus or device for mining cryptocurrency and for recuperating and transferring heat generated by mining components of the device into an open environment to be used, for example, in residential or commercial settings for heating purposes. As such, the device of the present invention enables a user to reduce the reliance on natural gas or other scarce resources for heating while facilitating the user to mine cryptocurrency. Thus, the approach according to the present invention of mining cryptocurrency provides for environmentally friendly and sustainable way to heat residential or commercial space, which also satisfies the ESG criteria for a corporate entity.

In one form of the present invention, a heater device connectable to a network and adapted to mine cryptocurrency includes a housing having at least one sidewall, a top cover, and a bottom cover, the at least one sidewall including a sound insulation layer connectable thereto. The heater device further includes a mining assembly, which may also be referred to herein as a mining rig, that is configured to mine cryptocurrency. The mining assembly has a shroud that includes a mining control board, a power supply unit, and several mining boards, which may also be referred to herein as hashing boards. It will thus be understood that the mining rig is a collection of the mining control board and several hashing boards, such as for example three hashing boards, with the mining control board being configured to control the three hashing boards. Further, the mining rig is an arrangement of hardware elements, such as either CPU, GPU, FPGA or ASIC, that have been arranged to perform cryptocurrency mining. It is contemplated that the heater device of the present invention uses an application-specific integrated circuit (ASIC), which is an integrated circuit (IC) chip. However, any one of the hardware elements or a combination thereof can be used without departing from the scope of the present invention. Further, it will be appreciated that the heater device may include more than one mining rig, and each may include any number of hashing boards.

The heater device also includes a fan assembly connectable to the mining assembly. The fan assembly is configured to transfer heat when generated by the mining assembly into an open environment outside of the heater device. It will be appreciated, however, that the fan assembly of the heater device can be eliminated such that the heat generated by the mining assembly is transferred into the open environment via convection. Alternatively, the fan assembly of the heater device may be replaced by, for example, a liquid cooling assembly, liquid-filled radiator, or some other type of heating radiator.

The sound insulation layer surrounds both the mining and fan assemblies to provide noise absorption of the mining assembly or fan assembly when the heater device is activated. Alternatively, the sound insulation layer may only surround either the mining assembly or the fan assembly to provide noise absorption of either the mining assembly or the fan assembly when the heater device is activated.

In one aspect, the mining assembly and the fan assembly are arranged in-line relative to one another such that the mining and fan assemblies are co-axial and are vertically stacked one upon another, with the fan assembly being above the mining assembly. Further, the fan assembly is positioned between the mining assembly and the top cover. Alternatively, the mining assembly and the fan assembly can be co-axial and positioned in a side-by-side arrangement, both being horizontally extending and generally parallel to a support surface, such as a floor.

In another aspect, the heater device may include one or more vibration dampeners positioned between the fan assembly and the top cover and/or one or more vibration dampeners connected to the bottom cover and positioned between the bottom cover and the mining assembly. It is envisioned that the vibration dampeners are configured as spring supports to help minimize low frequency noise due to vibrations.

In yet another aspect, the top cover includes a top filter attachable thereto. The filter is positioned between the top cover and the fan assembly such that there is a gap between the filter and the top cover. Additionally, or alternatively, the heater device includes one or more side or purification filters connected to the at least one sidewall and positioned near the bottom cover where one or more air intakes for the heater device are located.

In still another aspect, the bottom cover includes one or more wheels removably or permanently attached thereto to selectively facilitate movement of the heater device along the support surface, such as a floor.

In a further aspect, the bottom cover supports a power supply unit, a relay, one or more electrical connectors, a heat sink that is positioned underneath the mining assembly, and a control board or an embedded computing system. It is envisioned that the control board or embedded computing system is a single-board computer, such as for example Raspberry Pi or Orange Pi board. The control board is configured to control operating buttons of the heater device, control power supply, receive temperature readings, and etc. Also, it is envisioned that at least one of the one or more electrical connectors is a clamp connector.

In still a further aspect, the heater device also includes an adapter, a temperature meter disposed below the shroud of the mining assembly, with the shroud of the mining assembly including a safety thermostat, and a gyroscope or accelerometer for automatically deactivating the heater device when the heater device is tilted. It will be appreciated that the mining assembly includes one or more CPUs or IC chips and that the heater device is envisioned to include a temperature controlling thermostat that can control the frequency of the one or more CPUs or IC chips, thereby controlling the hashing power of the one or more CPUs or IC chips (the number of hash calculations per unit of time the one or more CPUs or IC chips perform) and the consumed power. The frequency is controlled through software, such as for example Braiins OS with an autotuning function that automatically tunes each individual hashing chip. The temperature controlling thermostat can communicate with the temperature meter to automate the heater device so that the heater device can automatically adjust and sustain desired temperature in a room.

In yet a further aspect, the shroud of the mining assembly includes two halves securely connectable to one another and an open top. The open top of the shroud is in fluid communication with the fan assembly so that the fan assembly can draw the heat generated by the mining assembly and transfer the heat to the open environment outside of the heater device.

In another form of the present invention, a heater device connectable to a network and adapted to mine cryptocurrency includes a housing having at least one sidewall, a top cover, and a bottom cover, the at least one sidewall including a sound insulation layer connectable thereto. The heater device also includes a mining assembly that is configured to mine cryptocurrency, the mining assembly has a shroud that includes a mining rig, a power supply unit, and a control board. The heater device further includes a fan assembly connectable to the mining assembly.

The fan assembly is configured to be positioned above the mining assembly in an in-line arrangement. The fan assembly is configured to transfer heat when generated by the mining assembly. The heater device also has a filter that is disposed between the top cover and the fan assembly. The sound insulation layer surrounds both the mining and fan assemblies to provide noise absorption of the mining assembly and fan assembly when the heater device is activated.

An advantage of the present invention is to provide a heater device with improved vibration dampeners and sound insulation to reduce both vibration and noise when the heater device is in its mining mode.

Another advantage of the present invention is to provide the heater device with improved anti-noise design of the heater body presenting an extra layer of plastic to cover the noise source, with additional noise absorbing materials added along the main side surfaces and on the top surface of the body of the heater device.

Still another advantage of the present invention is to provide the heater device with a thermal breaker that turns off the main power source relay if and when heatsinks of the hashing boards reach 100 degrees C. The software or software controls of the heater device are configured to regulate, adjust or reduce power or even turn off or deactivate the heater device if and when the chips of the heater device overheat.

Still another advantage of the present invention is to provide the heater device presenting a network configuration that protects unauthorized access to the mining board by an outside user.

Still another advantage of the present invention is to provide the heater device presenting an inventive software with a user mobile application such as Android and iOS applications for the user to track heating and mining performance, receive and manage mined crypto, manage account etc.

Still another advantage of the present invention is to provide the heater device presenting an inventive software, which enables a system operator to track performance of the heater device, manage user data and payments.

Still another advantage of the present invention is to provide the heater device presenting an inventive software running on mining control board managing operation of several hashing boards, i.e. sending commands for calculations, managing auto-tuning of particular chips, safety/overheating controls, fan controls.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
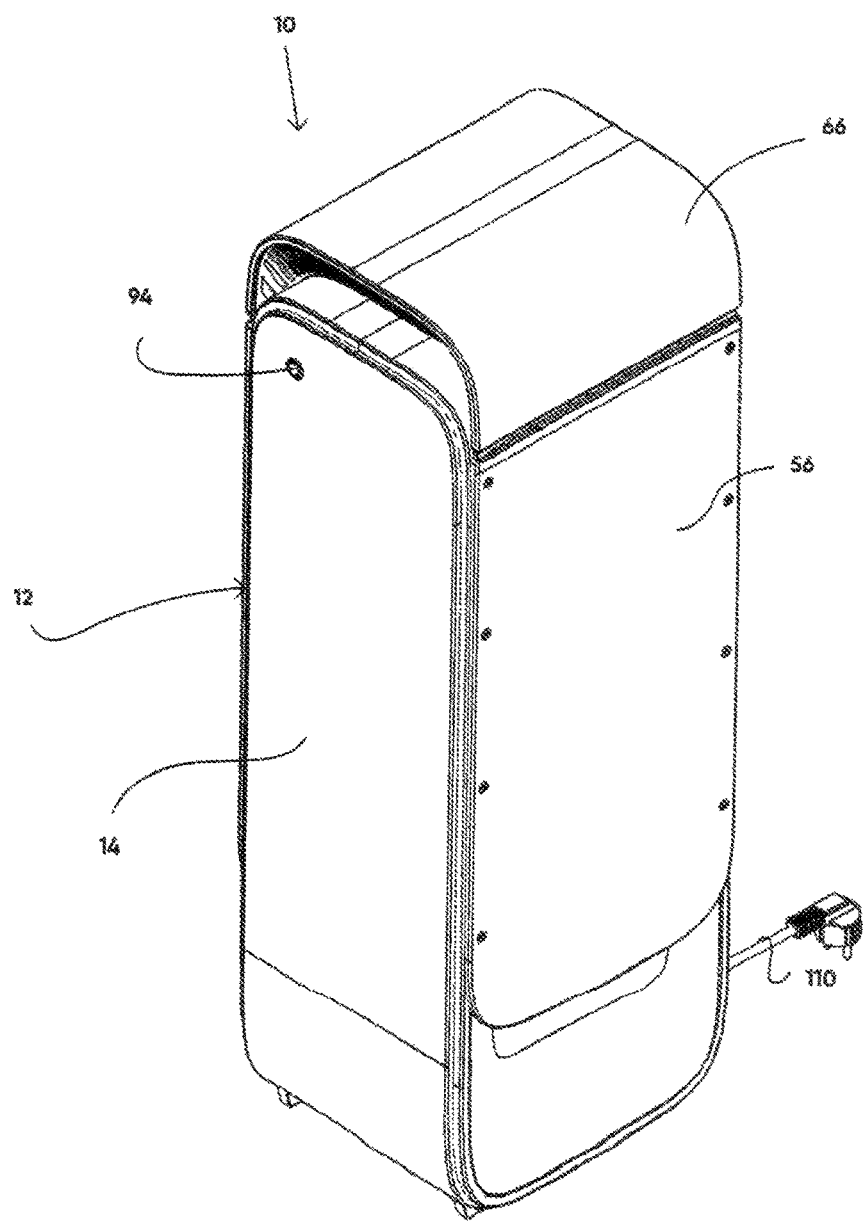
FIG. 1 shows a perspective front view of a heater device of the present invention.
Figure 2:
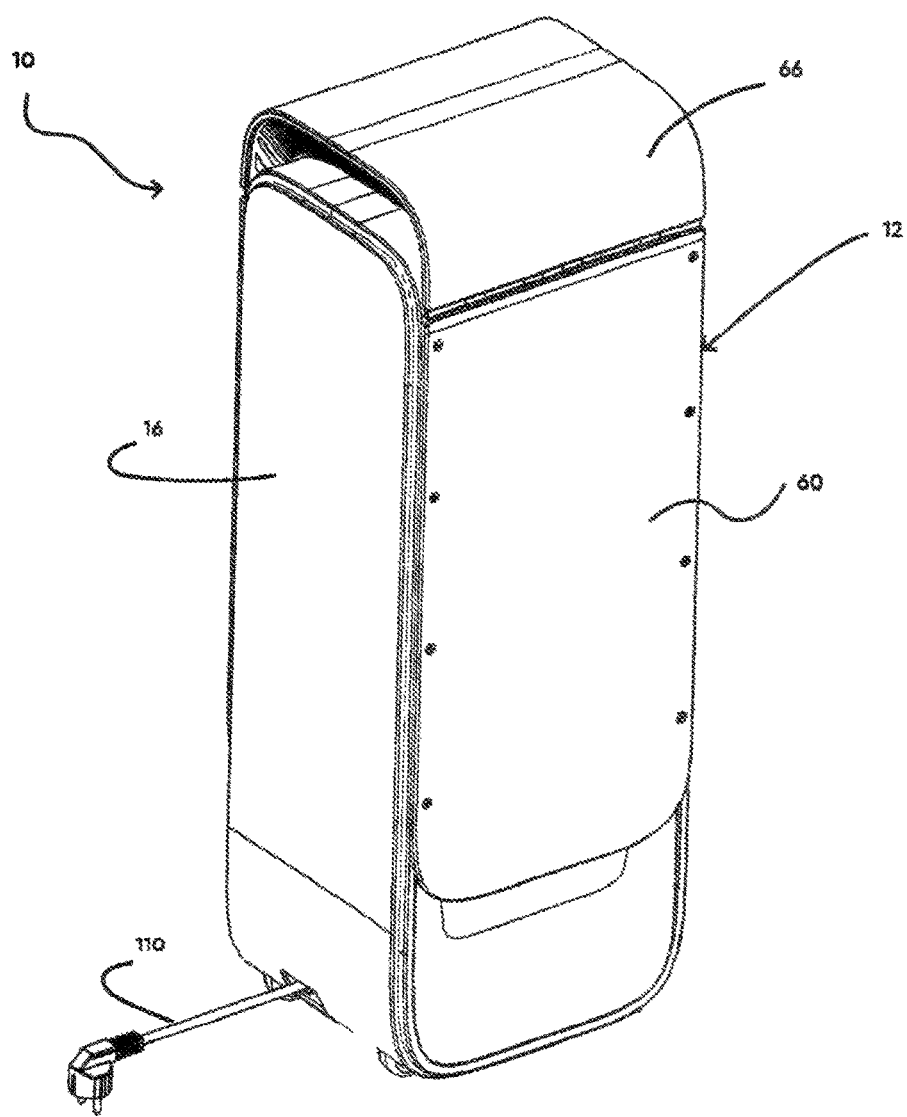
FIG. 2 shows a perspective rear view of the heater device.
Figure 3:
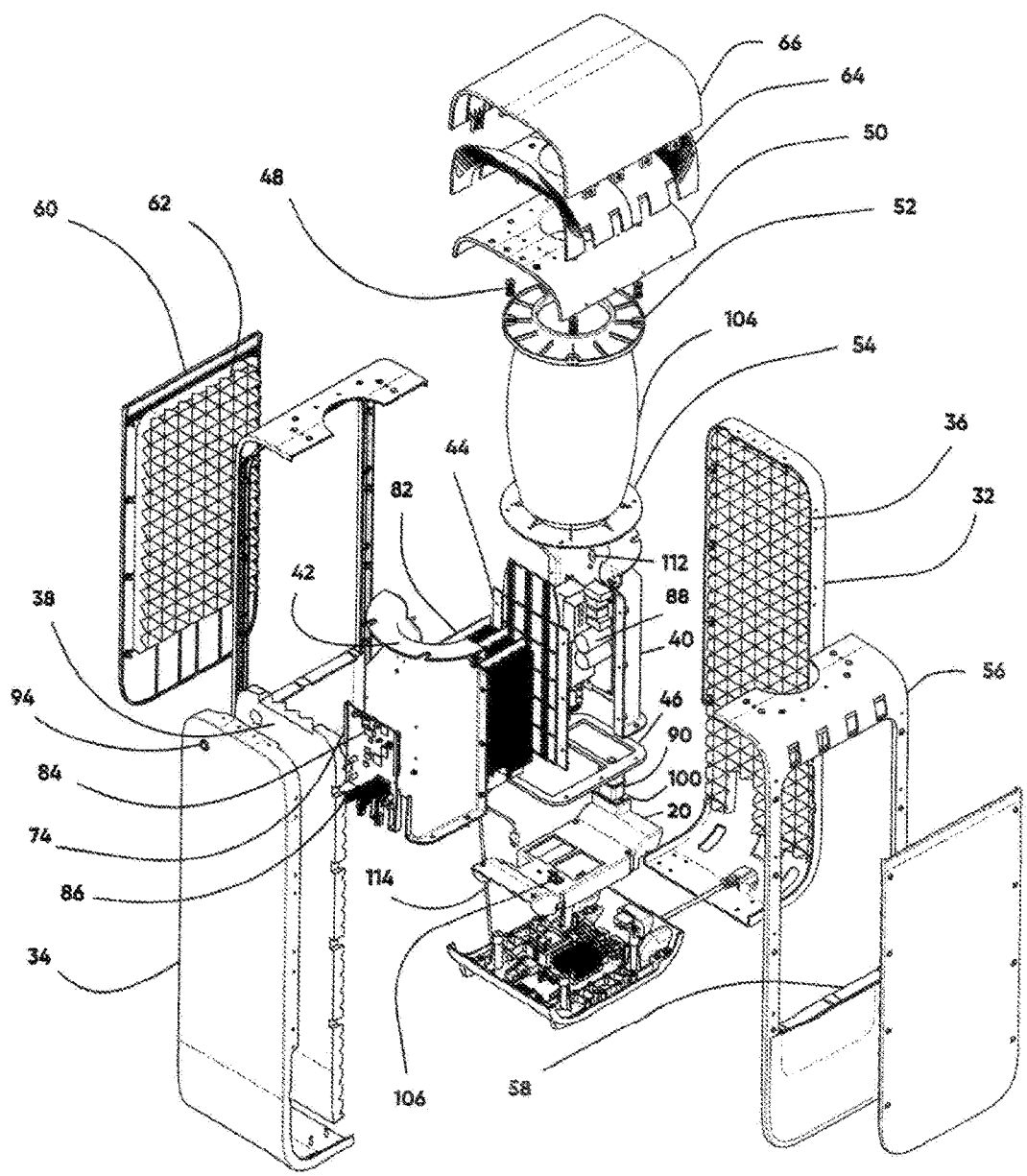
FIG. 3 shows an exploded view of the heater device.

Referring to the Figures, a heater device connectable to a network and adapted to mine cryptocurrency, is generally shown at 10 in FIGS. 1 through 3. Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The heating device 10 includes a body, generally indicated at 12, and presenting a front section 14 and a back section 16. The heating device 10 presents a generally rectangular configuration and the shape of the heating device 10 as presented and described in the present application and shown in FIGS. 1 and 2 is not intended to limit the scope of the present invention.

A protective cover 20 includes a generally rectangular configuration. A pair of axis parts 22 and 24 are connected to a bottom portion 24. The bottom portion 26 is shown in greater detailed and expanded in FIG. 4. A clamp 30 is inserted into one of the axis part 24. The front section 14 and the back section 16 are further extending to respective L-shaped sections 32 and 34 and sound insulation layers 36 and 38. A pair of box elements 40 and 42 are located between the L-shaped sections 32 and 34. A septum 44 is located between the box elements 40 and 42. A flange 46 of a generally rectangular configuration is positioned between the septum 44 and the protective cover 20. A plurality of vibration dampeners 48 are located below a cover 50 having a generally wedged cross section and a bottom flange 52. The heater device 10 also includes an adapter 54 and a pair of side panels, wherein only one is numbered at 56. A side wall 60 includes a sound insulation 62 at both side panels 56. A filter 64 is located between the cover 50 and a U-shaped section 66.

Figure 4:
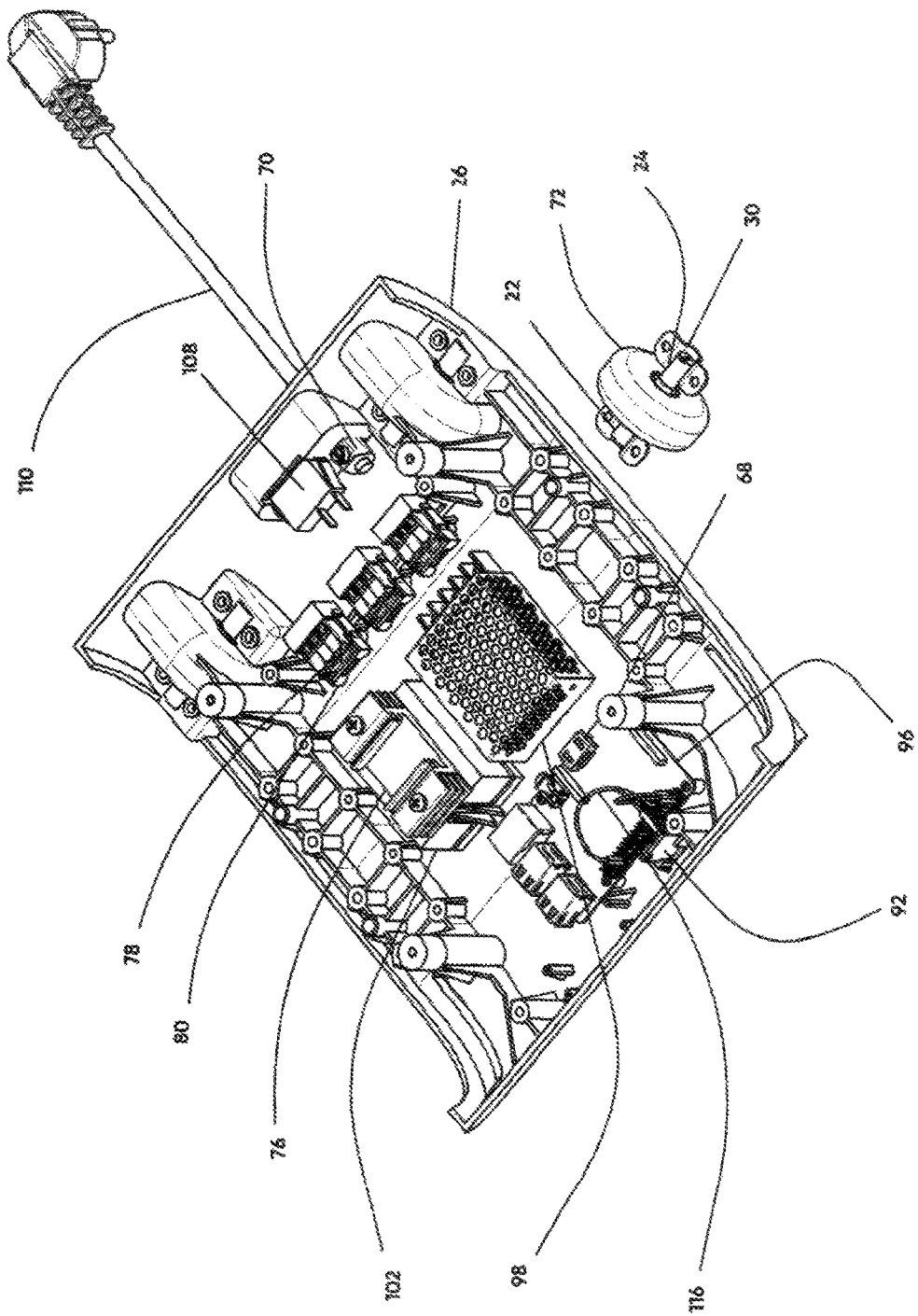
FIG. 4 shows a bottom portion of the heater device.
Figure 5:
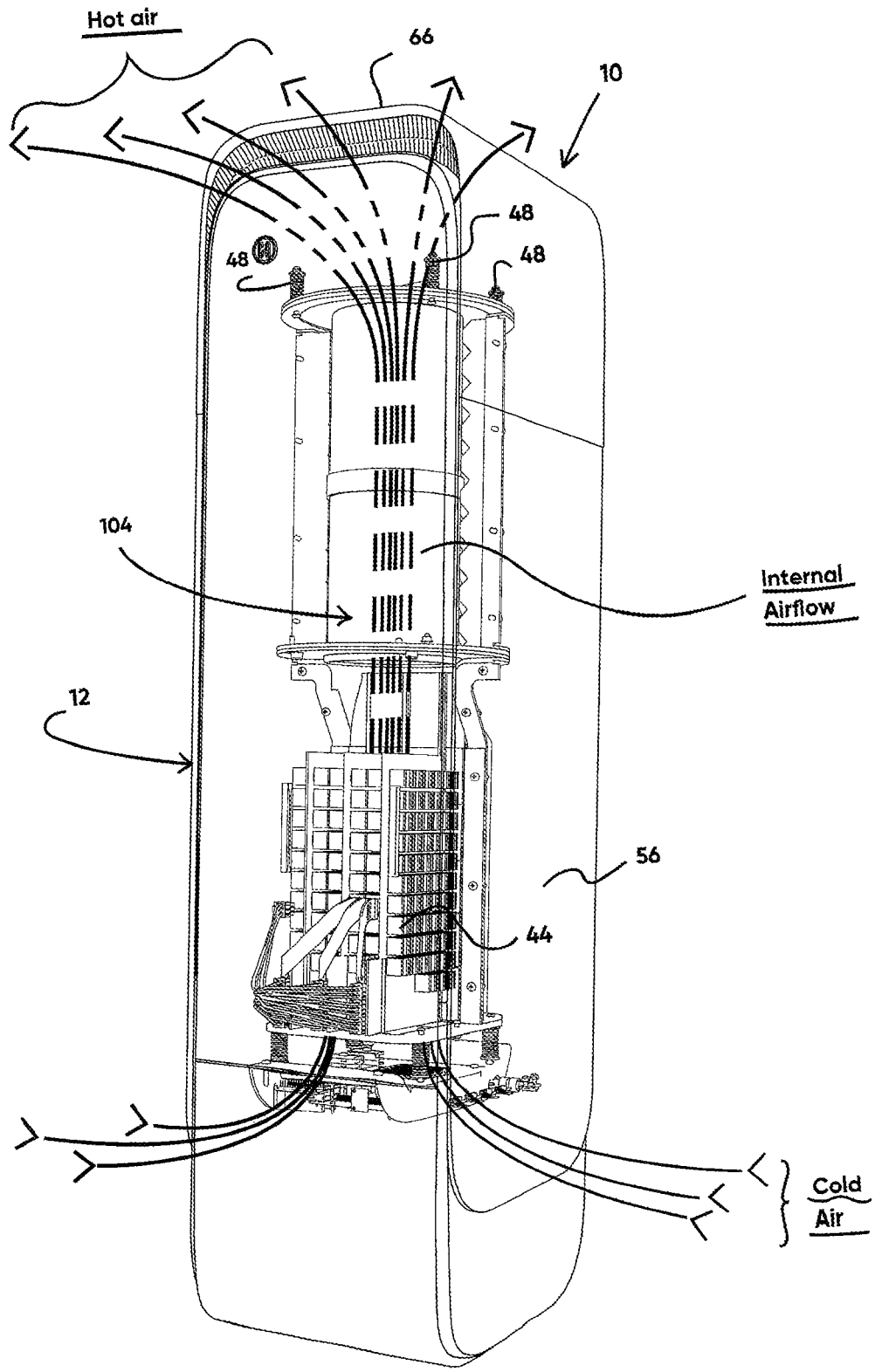
FIG. 5 shows an inside view of the heater device with direction of cold air transmitted through the heater device via an internal air flow and then escaping the heater device and a hot air.
Figure 6:
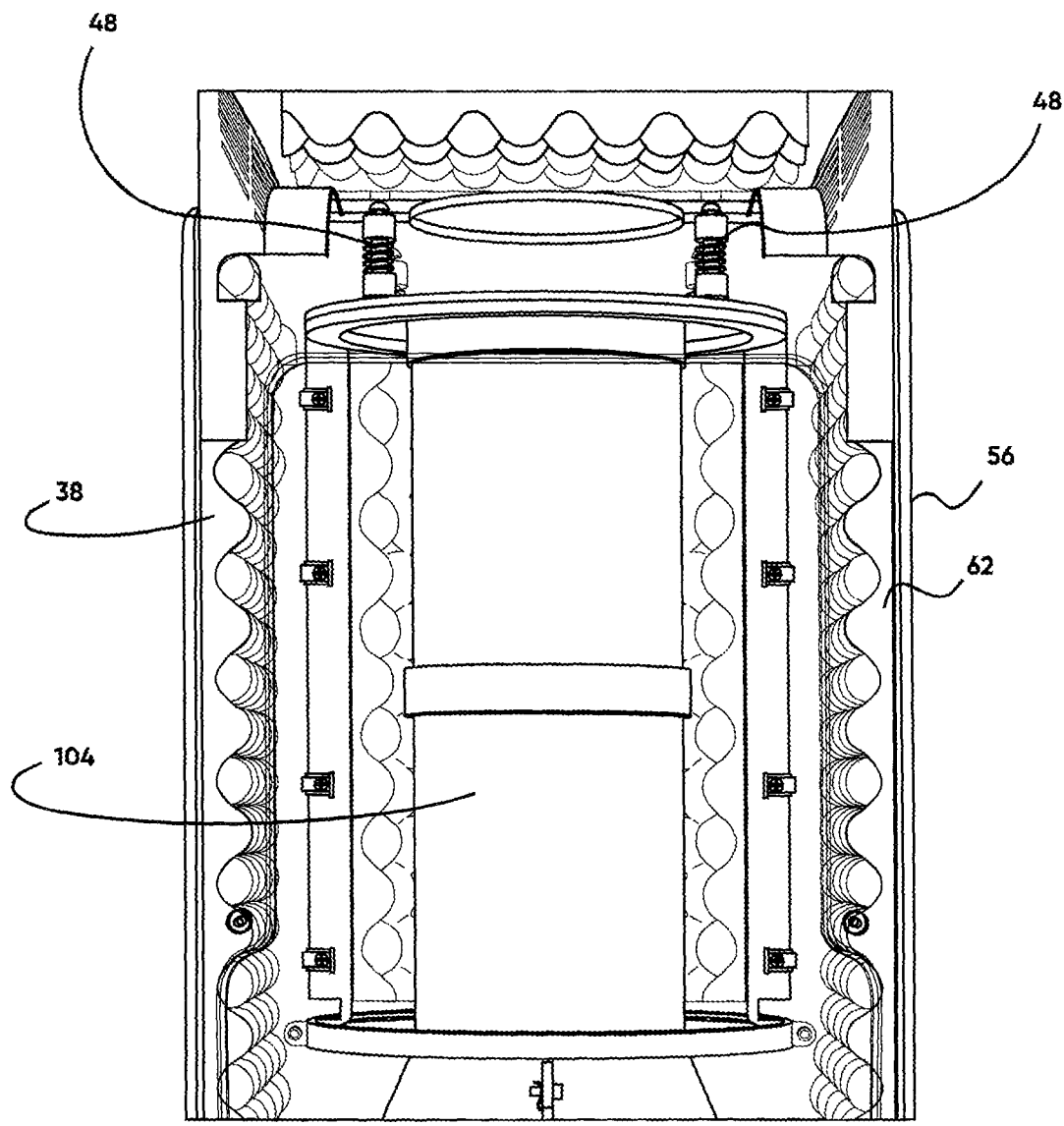
FIG. 6 shows partial interior view of the heater device.

Referring now to FIG. 4, a plurality of rubber metal buffers 68 are located on and extend from the bottom portion 26. A cable clamp 70 is positioned on the bottom portion 26. A wheel 72 is positioned on the pair of axis parts 22 and 24.

Referring back to FIG. 3, a card guide horizontal element 74 is positioned on one of the pair of box elements 42. A heatsink 76 is also provided as shown in FIG. 4 along with a Wago connector 78 and a Wago mount holder 80. A mining board 82, a control board 84, a flat flex cable 86, a power supply unit 88, a detachable plug 90 are located within the pair of box elements 40 and 42. A gyroscope 92 and Raspberry pi 3b+96 are positioned on the bottom portion 26. A push button 94 is located on the front section 14. A power connector 100 is located between the flange 46 and the protective cover 20. A relay 102 is also located on the bottom portion 26. A fan 104 is disposed between the bottom flange 52 and the adapter 54. A temperature meter 106 is located on the protective cover 20.

Referring back to FIG. 4, a switch 108 is located on the protective cover 20 with a power supply wire 110 extending from the protective cover 20. The heater device 10 also includes a safety thermostat 112 and an internet wire 114. A Junper wire 116 is positioned the protective cover 20

In another alternative embodiment of the present invention, the heater device 10 includes a housing or the aforementioned body 12 having at least one sidewall, such as the L-shaped sections 32 and 34 and the sound insulation layers 36 and 38, a top cover, such as the U-shaped section 66, and a bottom cover or the protective cover 20, the at least one sidewall including a sound insulation layer connectable thereto, such as the side wall 60 with the sound insulation 62 at both side panels 56. The mining assembly is configured to mine cryptocurrency and includes a shroud that includes the mining motherboard 82, the power supply unit 88, and the control board 84. The fan assembly 104 connectable to the mining assembly, is configured to transfer heat when generated by the mining assembly. The sound insulation layer 62 surrounds both the mining and fan assemblies to provide noise absorption of the mining assembly or the fan assembly 104 when the heater device 10 is activated.

The mining assembly and the fan assembly 104 are arranged in-line relative to one another. The fan assembly 104 is disposed between the mining assembly and the top cover 66. The heater device 10 includes one or more of the vibration dampeners 48 disposed between the fan assembly 104 and the top cover 66. The top cover 66 includes a filter 64 attachable thereto. The bottom cover 20 includes one or more wheels 72 attachable thereto to selectively facilitate movement of the heater device 10 along a support surface (not shown). The bottom cover 20 supports the power source mean well 98, the relay 102, one or more electrical connectors, and a single-board computer (SBC) 96. The SBC 96 is a Raspberry Pi board, and wherein at least one of the one or more electrical connectors is a clamp connector.

The bottom cover 20 supports a heat sink 28 that is positioned underneath the mining assembly. The heater device 10 includes a gyroscope 92 or accelerometer for automatically deactivating the heater device 10 when tilted. The heater device 10 includes the adapter 56. The heater device 10 further includes the shroud of the mining assembly comprising two halves 40 and 42 connectable to one another and an open top, and wherein the open top of the shroud is in fluid communication with the fan assembly 104. The heater device 10 further includes a temperature meter 106 disposed below the shroud of the mining assembly, and wherein the shroud of the mining assembly includes a safety thermostat 112.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing.

The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heater device connectable to a network and adapted to mine cryptocurrency, the heater device comprising:
   a housing having at least one sidewall, a top cover, and a bottom cover, the at least one sidewall including a sound insulation layer connectable thereto;
   a mining assembly configured to mine cryptocurrency, the mining assembly comprising a shroud that includes a mining control board, a power supply unit, and a plurality of hashing boards; and
   a fan assembly connectable to the mining assembly, the fan assembly is configured to transfer heat when generated by the mining assembly;
   wherein the sound insulation layer surrounds at least one of the mining and fan assemblies to provide noise absorption of the mining assembly or fan assembly when the heater device is activated.

2. The heater device of claim 1, wherein the mining assembly and the fan assembly are arranged in-line relative to one another, and wherein the fan assembly is disposed between the mining assembly and the top cover.

3. The heater device of claim 1 further comprising:
   one or more vibration dampeners disposed between the fan assembly and the top cover; and
   one or more vibration dampeners attached to the bottom cover and positioned between the bottom cover and the mining assembly.

4. The heater device of claim 1 further comprising:
   a filter disposed between the top cover and the fan assembly; and
   one or more purification filters attached to the at least one sidewall and near an air intake of the heater device.

5. The heater device of claim 1, wherein the bottom cover includes one or more wheels attachable thereto to selectively facilitate movement of the heater device along a support surface.

6. The heater device of claim 1, wherein the bottom cover supports a power supply unit, a relay, one or more electrical connectors, and an embedded computing system.

7. The heater device of claim 6, wherein the embedded computing system is a single-board computer, and wherein at least one of the one or more electrical connectors is a clamp connector.

8. The heater device of claim 1, wherein the bottom cover supports a heat sink that is positioned underneath the mining assembly.

9. The heater device of claim 1 further comprising a gyroscope or accelerometer for automatically deactivating the heater device when tilted.

10. The heater device of claim 1 further comprising an adapter connected to the fan assembly or the mining assembly.

11. The heater device of claim 1, wherein the shroud of the mining assembly comprises two halves connectable to one another and an open top, and wherein the open top of the shroud is in fluid communication with the fan assembly.

12. The heater device of claim 1 further comprising a temperature meter disposed below the shroud of the mining assembly, and wherein the shroud of the mining assembly includes a safety thermostat.

13. A heater device connectable to a network and adapted to mine cryptocurrency, the heater device comprising:
    a housing having at least one sidewall, a top cover, and a bottom cover, the at least one sidewall including a sound insulation layer connectable thereto;
    a mining assembly configured to mine cryptocurrency, the mining assembly comprising a shroud that includes a mining control board, a power supply unit, and one or more hashing boards;
    a fan assembly connectable to the mining assembly, wherein the fan assembly is configured to be positioned above the mining assembly in an in-line arrangement, and wherein the fan assembly is configured to transfer heat when generated by the mining assembly; and
    a filter disposed between the top cover and the fan assembly;
    wherein the sound insulation layer surrounds both the mining and fan assemblies to provide noise absorption of the mining assembly and fan assembly when the heater device is activated.

14. The heater device of claim 13 further comprising one or more vibration dampeners disposed between the fan assembly and the top cover, wherein the one or more vibration dampeners are springs configured to dampen low-frequency noise.

15. The heater device of claim 13, wherein the bottom cover includes one or more wheels attachable thereto to selectively facilitate movement of the heater device along a support surface.

16. The heater device of claim 13, wherein the bottom cover supports a power source mean well, a relay, one or more electrical connectors, a heat sink that is positioned underneath the mining assembly, and a single-board computer (SBC), wherein the SBC is a Raspberry Pi board, and wherein at least one of the one or more electrical connectors is a clamp connector.

17. The heater device of claim 13 further comprising a gyroscope or accelerometer for automatically deactivating the heater device when tilted.

18. The heater device of claim 13, wherein the shroud of the mining assembly comprises two halves connectable to one another and an open top, and wherein the open top of the shroud is in fluid communication with the fan assembly.

19. The heater device of claim 13 further comprising a temperature meter disposed below the shroud of the mining assembly, and wherein the shroud of the mining assembly includes a safety thermostat.

20. A heater device connectable to a network and adapted to mine cryptocurrency, the heater device comprising:
- a housing having at least one sidewall, a top cover, and a bottom cover, the at least one sidewall including a sound insulation layer connectable thereto;
- a mining assembly configured to mine cryptocurrency, the mining assembly comprising a shroud that includes a mining control board, a power supply unit, and one or more hashing boards;
- a fan assembly connectable to the mining assembly, wherein the fan assembly is configured to be positioned above the mining assembly in an in-line arrangement, and wherein the fan assembly is configured to transfer heat when generated by the mining assembly;
- a filter disposed between the top cover and the fan assembly;

wherein the sound insulation layer surrounds both the mining and fan assemblies to provide noise absorption of the mining assembly or fan assembly when the heater device is activated;
- one or more vibration dampeners disposed between the fan assembly and the top cover, wherein the one or more vibration dampeners are springs configured to dampen low-frequency noise, wherein the bottom cover includes one or more wheels attachable thereto to selectively facilitate movement of the heater device along a support surface, wherein the bottom cover supports a power source mean well, a relay, one or more electrical connectors, a heat sink that is positioned underneath the mining assembly, and a single-board computer (SBC), wherein the SBC is a Raspberry Pi board, and wherein at least one of the one or more electrical connectors is a clamp connector;
- a gyroscope or accelerometer for automatically deactivating the heater device when tilted;
- an adapter;
- the shroud of the mining assembly comprises two halves connectable to one another and an open top, and wherein the open top of the shroud is in fluid communication with the fan assembly; and
- a temperature meter disposed below the shroud of the mining assembly, and wherein the shroud of the mining assembly includes a safety thermostat.

* * * * *